(12) United States Patent
Yoshida et al.

(10) Patent No.: US 7,312,904 B2
(45) Date of Patent: Dec. 25, 2007

(54) APPARATUS, METHOD AND PROGRAM FOR COMMUNICATION

(75) Inventors: Takehiro Yoshida, Tokyo (JP); Hitoshi Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 908 days.

(21) Appl. No.: 10/600,433

(22) Filed: Jun. 23, 2003

(65) Prior Publication Data
US 2004/0021910 A1 Feb. 5, 2004

(30) Foreign Application Priority Data
Jul. 2, 2002 (JP) ............................. 2002-193330

(51) Int. Cl.
*H04N 1/04* (2006.01)
(52) U.S. Cl. .............. 358/474; 358/1.15; 358/1.9; 358/442; 358/402; 379/100.17; 379/93.4; 379/406.08; 379/406.1
(58) Field of Classification Search ............... 358/474, 358/400, 1.15, 1.9, 442, 402, 500, 405; 379/100.17, 379/93.32, 93.4, 406.08, 406.1
See application file for complete search history.

(56) References Cited

U.S. PATENT DOCUMENTS

| | | | | |
|---|---|---|---|---|
| 4,609,927 | A | | 9/1986 | Yoshida ........................ 346/154 |
| 4,910,506 | A | * | 3/1990 | Yoshida et al. ........... 340/825.52 |
| 5,661,568 | A | * | 8/1997 | Ueno ............................ 358/435 |
| 5,809,046 | A | * | 9/1998 | Sayama ........................ 714/708 |
| 6,493,102 | B1 | * | 12/2002 | Kobayashi et al. ........... 358/1.15 |
| 7,075,682 | B1 | * | 7/2006 | Eguchi et al. ................. 358/434 |
| 2003/0090739 | A1 | | 5/2003 | Yoshida ........................ 358/405 |

FOREIGN PATENT DOCUMENTS

| | | |
|---|---|---|
| JP | 62-11326 | 1/1987 |
| JP | 3-272267 | 12/1991 |
| JP | 4-126456 | 4/1992 |
| JP | 5-304599 | 11/1993 |
| JP | 6-38009 | 2/1994 |

* cited by examiner

*Primary Examiner*—Aung S. Moe
*Assistant Examiner*—Negussie Worku
(74) *Attorney, Agent, or Firm*—Fitzpatrick, Cella, Harper & Scinto

(57) ABSTRACT

Facsimile communication is correctly performed even when an echo is generated in a communication line having a delay, by handling an echo signal in such a manner that when an echo of a CFR signal (according to the ITU-T recommendation V.21) transmitted from a receiving communication apparatus is received by the receiving communication apparatus, the echo signal is not recognized as a carrier of a picture signal and training data is not adjusted on the basis of the received echo signal, thereby making it possible to receive a correct short training/picture signal which arrives thereafter. A facsimile communication procedure includes storing training information when long training information is received, detecting success in receiving short training information, detecting high-speed data, setting the stored training information into the modem, and changing the receiving operation in response to detection of short training information and high speed data.

10 Claims, 11 Drawing Sheets

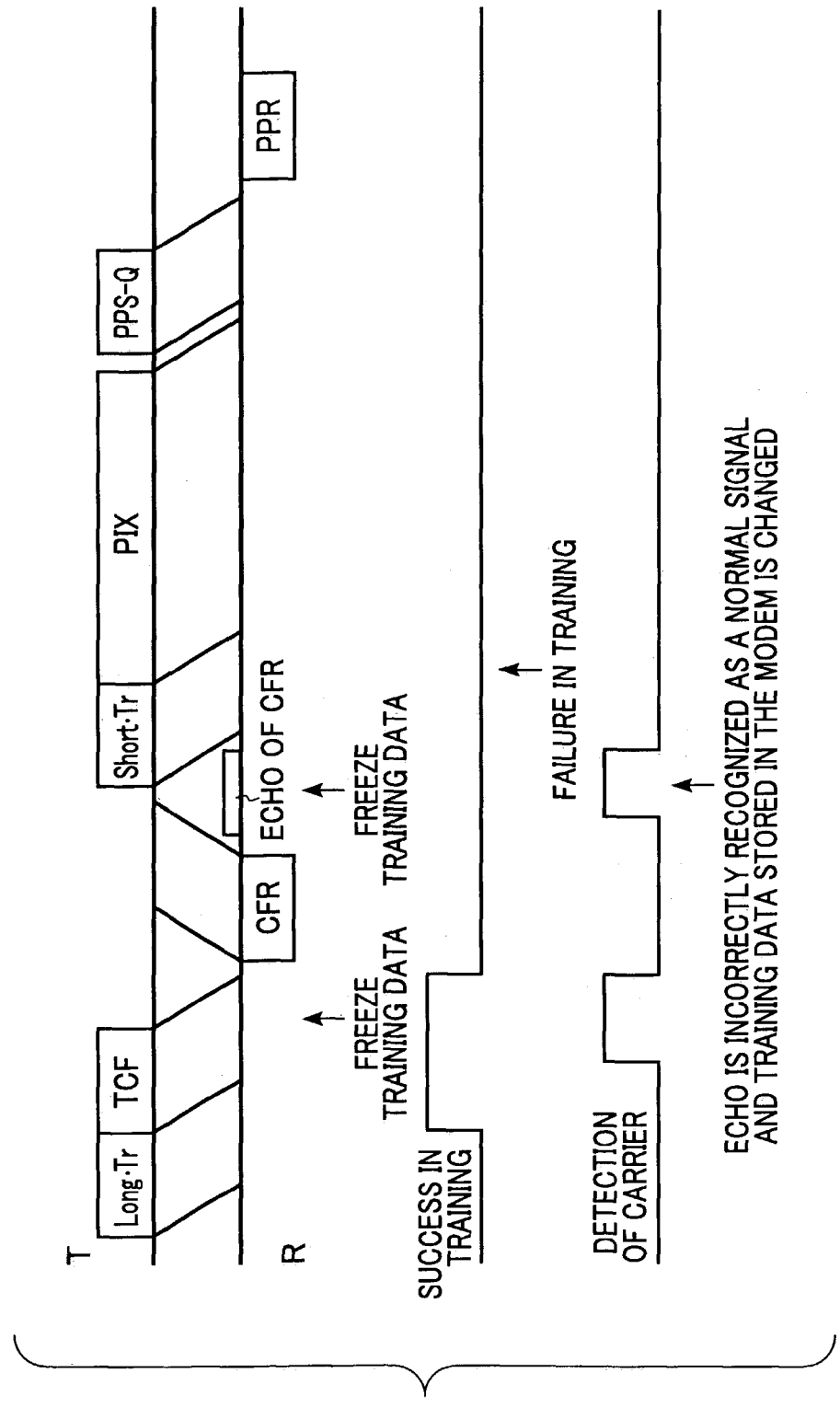

APPARATUS, METHOD AND PROGRAM FOR COMMUNICATION

BACKGROUND OF THE INVENTION

1. Field of the Invention

The present invention relates to a communication apparatus such as a facsimile machine, a communication method, and a program, and more particularly, to a facsimile machine having a capability of facsimile transmission according to the ITU-T recommendation V.17.

2. Description of the Related Art

In the art of communication apparatus, a facsimile machine or the like is known which has a capability of facsimile communication according to the ITU-T recommendation V.17. In the facsimile communication according to the ITU-T recommendation V.17, when a long training/TCF signal is received, training information (correction value by means of training) is fixed (hereinafter, referred to as "frozen"), while, during an operation of receiving a short training/picture signal, training information is frozen each time a carrier of a picture signal is detected.

Even when training information is frozen, if a modem is set into a mode in which a short training/picture signal is received, training information is adaptively updated.

However, when facsimile communication is performed by using a particular modem, if an echo is generated in a communication line having a delay, an echo of a CFR signal (according to the ITU-T recommendation V.21) transmitted from a receiving facsimile machine is received by the receiving facsimile machine. The receiving facsimile machine incorrectly recognizes the received echo signal as a carrier of a picture signal and adjusts training data on the basis of the echo of the CFR signal. In this case, even if a correct short training/picture signal arrives thereafter, the receiving facsimile machine cannot receive it (more precisely, the received signal cannot be correctly demodulated).

The above problem is described in further detail below with reference to FIGS. 10 and 11. When a high-speed signal (picture signal) is not found (cannot be correctly demodulated), one possible operation which may occur in a receiving facsimile machine is, as shown in FIG. 10, timeout of a T2 timer according to the ITU-T recommendation T.30. In this case, the receiving facsimile machine terminates the current communication. FIG. 11 shows another possible operation. In this example, when a picture signal is not correctly received, if a receiving facsimile machine finds PPS-Q, the receiving facsimile machine transmits PPR to request retransmission of the picture signal.

SUMMARY OF THE INVENTION

An object of the present invention is to provide a communication apparatus such as a facsimile machine, a communication method, and a program, which allow a modem to correctly perform facsimile communication even when an echo is generated in a communication line having a delay, by handling an echo signal in such a manner that when an echo of a CFR signal (according to the ITU-T recommendation V.21) transmitted from a receiving communication apparatus is received by the receiving communication apparatus, the echo signal is not recognized as a carrier of a picture signal and training data is not adjusted on the basis of the received echo signal, thereby making it possible to receive a correct short training/picture signal which arrives thereafter.

Further objects, features and advantages of the present invention will become apparent from the following description of the preferred embodiments with reference to the attached drawings.

BRIEF DESCRIPTION OF THE DRAWINGS

FIG. 11 is a diagram showing a protocol executed by a conventional facsimile machine when there is an echo.

DESCRIPTION OF THE PREFERRED EMBODIMENTS

First Embodiment

Figure 1:
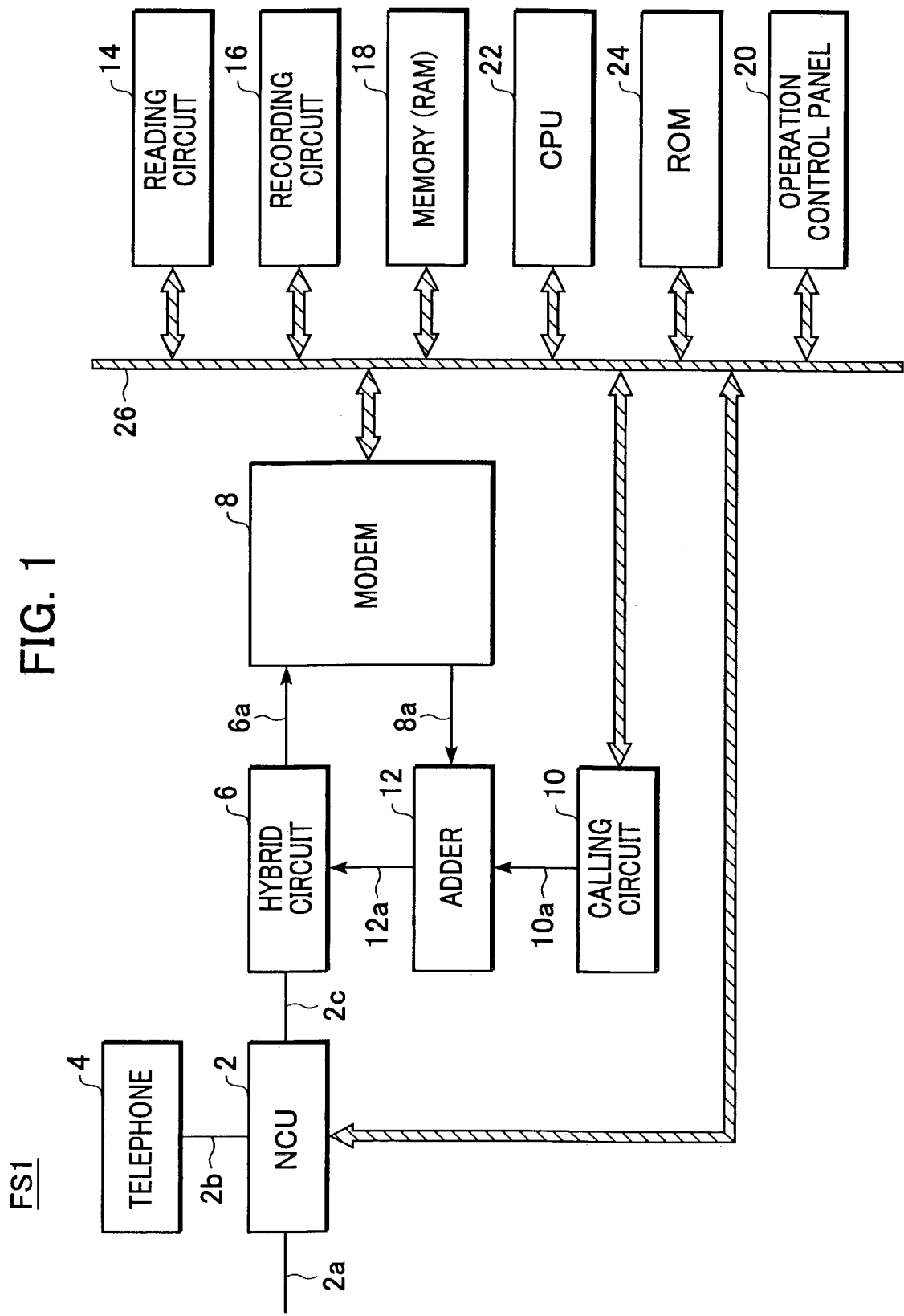
FIG. 1 is a block diagram showing a facsimile machine according to an embodiment of the present invention.

FIG. 1 is a block diagram showing a facsimile machine FS1 according to an embodiment of the present invention.

In the facsimile machine FS1, an NCU (network control unit) 2 is a device which makes it possible to perform data communication or the like using a telephone line 2a. The NCU 2 is connected at an end of the telephone line 2a and controls connection to the telephone line 2a. When data communication is performed, the NCU 2 connects a data communication line to the telephone line 2a and holds a loop. More specifically, in accordance with a command received via a bus 26, the NCU 2 connects the telephone line 2a to a telephone device 4 (by turning off CML) or to a facsimile machine (by turning on CML). Note that the telephone line 2a is normally connected to the telephone device 4.

A hybrid circuit 6 separates a transmitting signal and a received signal from each other. More specifically, if the hybrid circuit 6 receives a transmitting signal from an adder 12, the hybrid circuit 6 transfers the transmitting signal to the telephone line 2a via the NCU 2. On the other hand, if the hybrid circuit 6 receives a signal from the outside via the NCU 2, the hybrid circuit 6 transfers the received signal to a modem 8 via a signal line 6a.

The modem 8 performs modulation and demodulation in accordance with the ITU-T recommendations V.8, V.21, V.27ter, V.29, V.17, and/or V.34 in a transmission mode specified by a command supplied via the bus 26. If the modem 8 receives a transmitting signal via the bus 26, the modem 8 modulates the transmitting signal and outputs resultant modulated data to a signal line 8a. On the other hand, if a received signal is input to the modem 8 via the signal line 6a, the modem 8 demodulates the received signal and outputs resultant demodulated data to the bus 26.

If a calling circuit 10 receives a signal indicating telephone number information via the bus 26, the calling circuit 10 outputs a DTMF selection signal to a signal line 10a.

An adder 12 adds information supplied via a signal line 8a and information supplied via signal line 10a and outputs a result to a signal line 12a.

A reading circuit 14 outputs read data to the bus 26.

A recording circuit 16 records, line by line, information supplied via the bus 26.

A memory 18 functions as a work memory (RAM) and also as a memory for storing raw information associated with read data or encoded information. The memory 18 is also used to store received information or decoded information received via the bus 26.

An operation control panel 20 includes a one-touch dialing key, an abbreviated dialing key, ten-keys, a *-key, a #-key a start key, a stop key, a set key, and other function keys. If information is input by pressing one or more keys, the input information is output over the bus 26. The operation control panel 20 also includes a display for displaying information supplied via the bus 26.

A CPU (central processing unit) 22 is responsible for generally controlling the facsimile machine FS1 and executes a facsimile transmission control procedure in accordance with a control program stored in a ROM 24.

Figure 2:
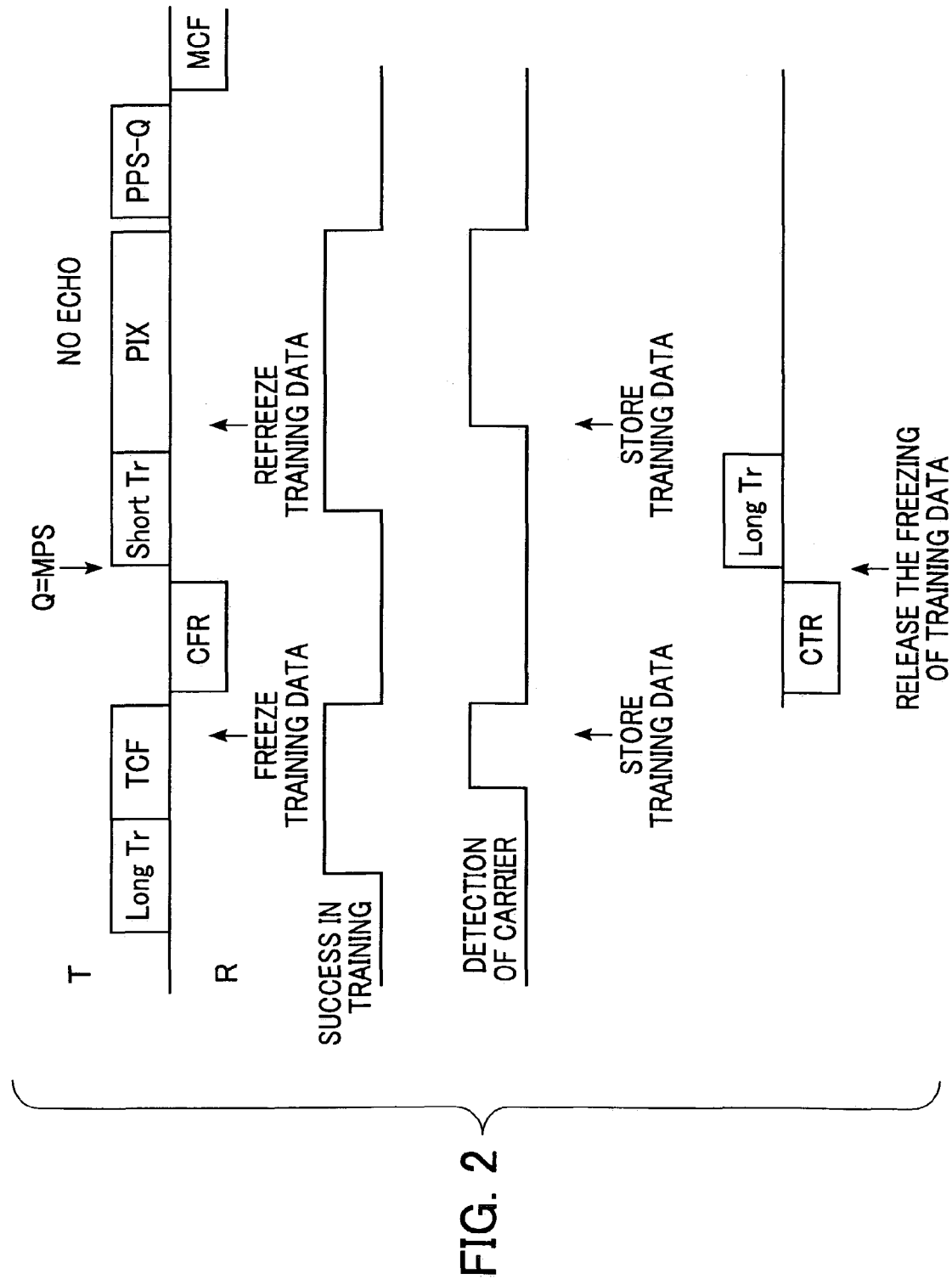
FIG. 2 is a diagram showing a protocol executed by the facsimile machine shown in FIG. 1 when there is no echo, information indicating success in training and information indicating that a carrier is detected.

FIG. 2 shows a protocol executed in the present embodiment when there is no echo. Information indicating that training information has been successfully received and information indicating that a high-speed carrier has been detected are also shown in FIG. 2.

In this case, if the modem 8 receives a TCF signal and detects a 0-signal continuing for 1 sec, the CPU 22 commands the modem 8 to freeze (fix) training data. When the modem 8 receives a picture signal and detects a high-speed carrier, the CPU 22 also commands the modem 8 to freeze training data.

Furthermore, when the modem 8 receives the TCF signal and detects the 0-signal continuing for 1 sec, the CPU 22 reads the training data from the modem 8 and stores it into the RAM 18. Similarly, when the modem 8 receives the picture signal and detects the high-speed carrier, the CPU 22 reads the training data from the modem 8 and stores it into the RAM 18.

When a PPS-MPS signal is received, an MCF signal is transmitted, and receiving of a short training/picture signal is started. On the other hand, when a PPS-EOM signal is received, an MCF signal is transmitted and then a DIS signal is transmitted. When a CTC signal is received, a CTR signal is transmitted and receiving of a long training/picture signal is started.

After completion of transmitting the CTR signal, the CPU 22 commands the modem to release the freezing of the training data.

Figure 3:
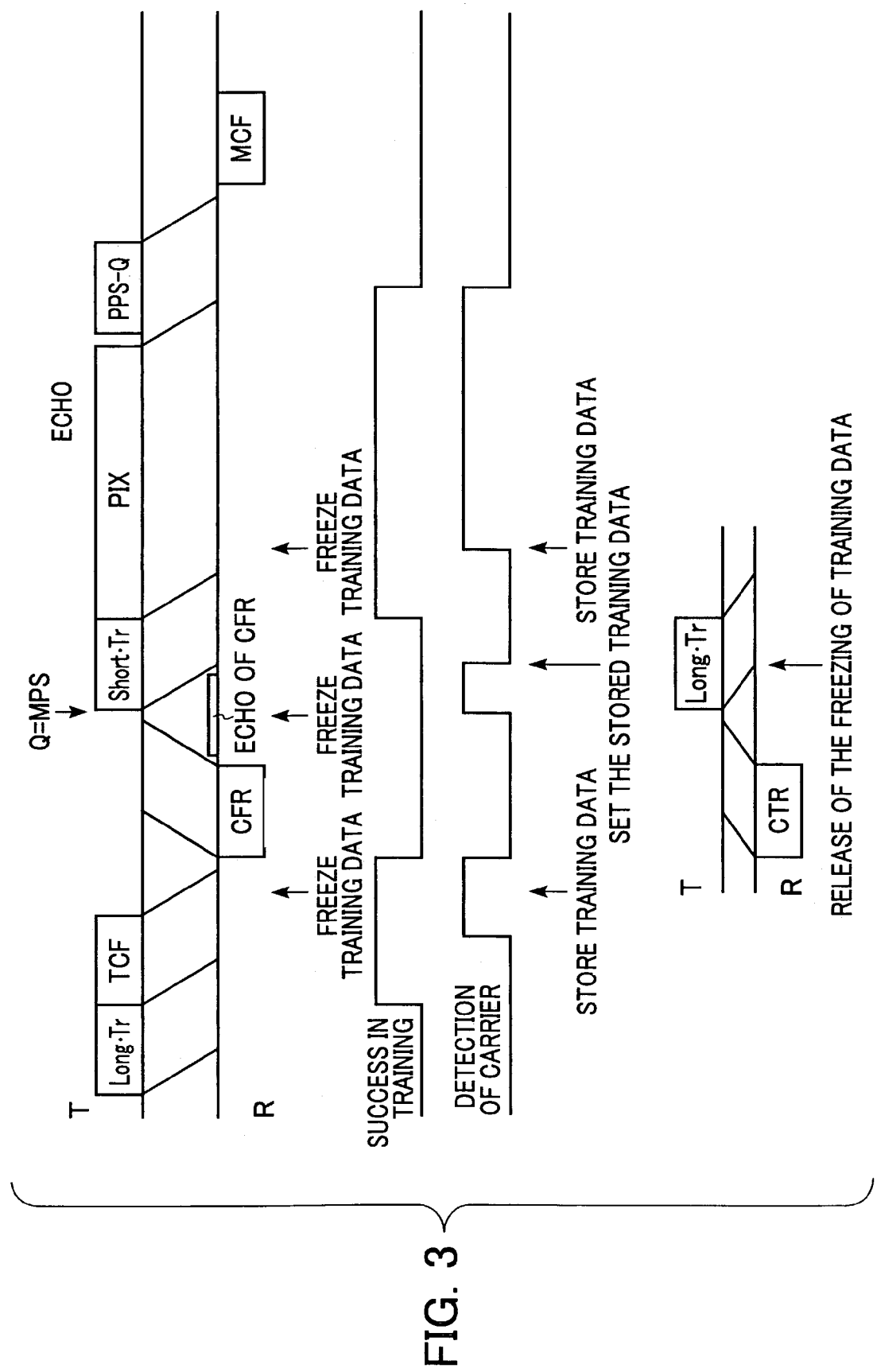
FIG. 3 is a diagram showing a protocol executed by the facsimile machine shown in FIG. 1 when there is an echo, information indicating success in training and information indicating that a carrier is detected.
Figure 4:
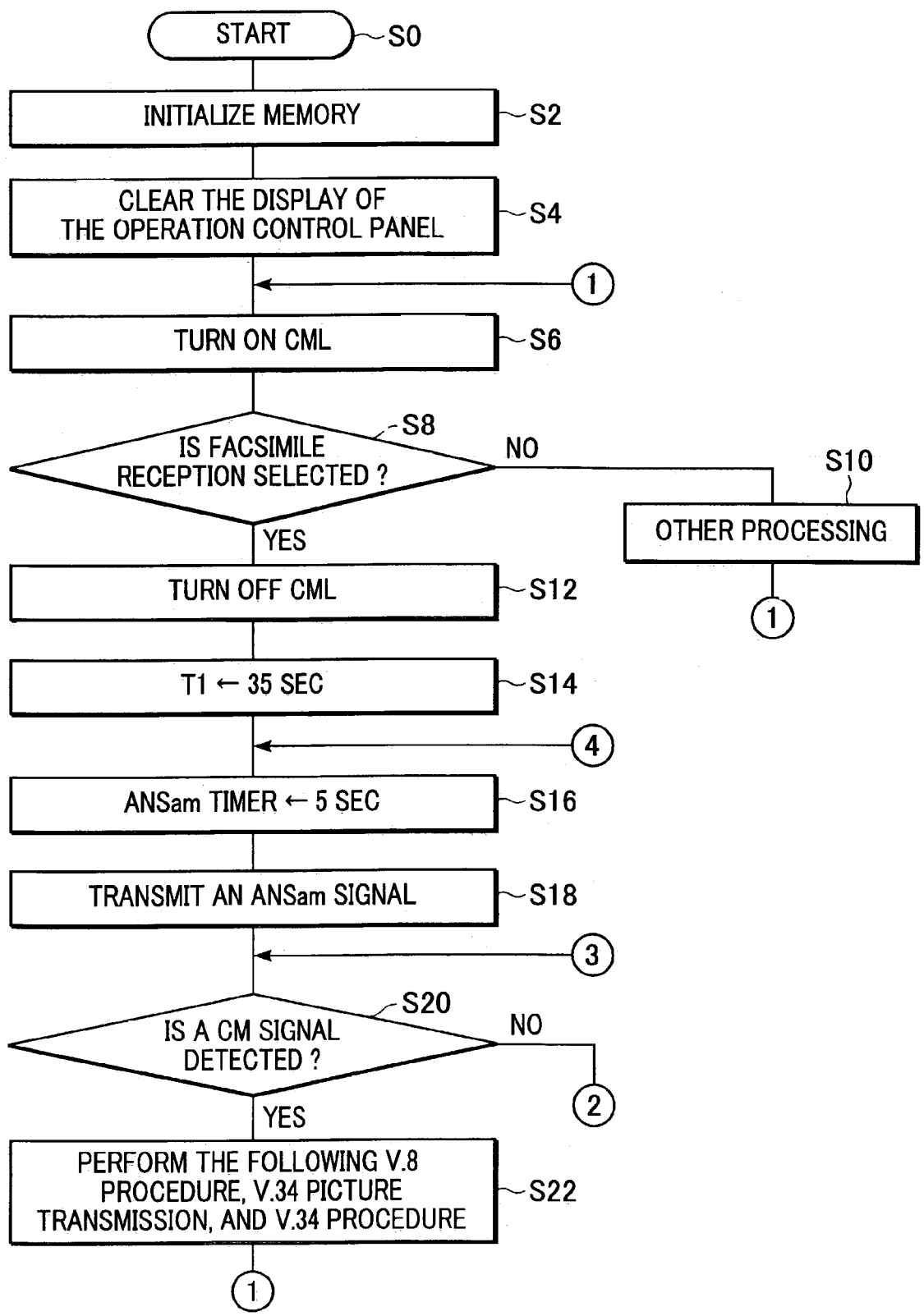
FIG. 4 is a flow chart showing an operation of the facsimile machine shown in FIG. 1.
Figure 5:
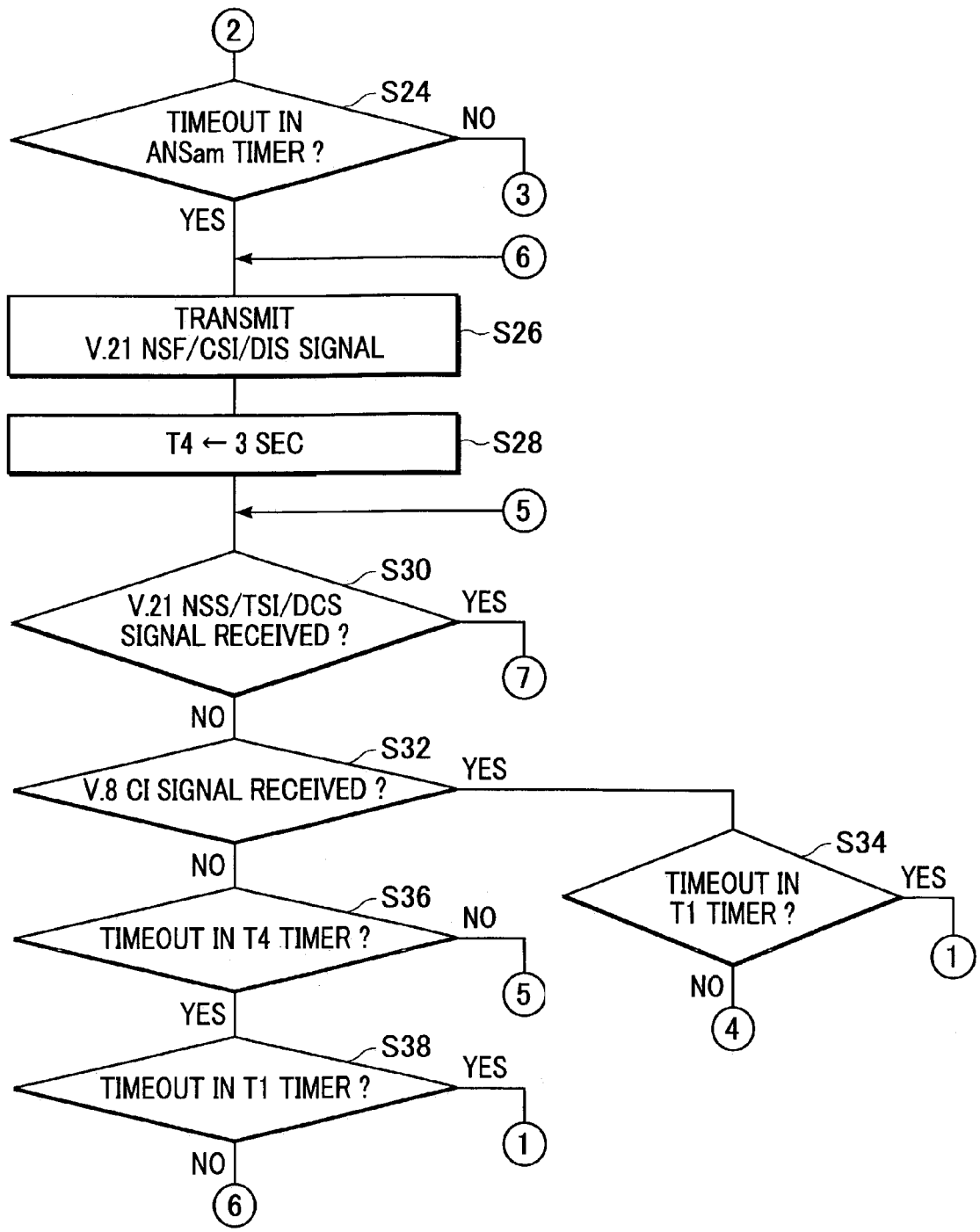
FIG. 5 is a flow chart showing an operation of the facsimile machine shown in FIG. 1.
Figure 6:
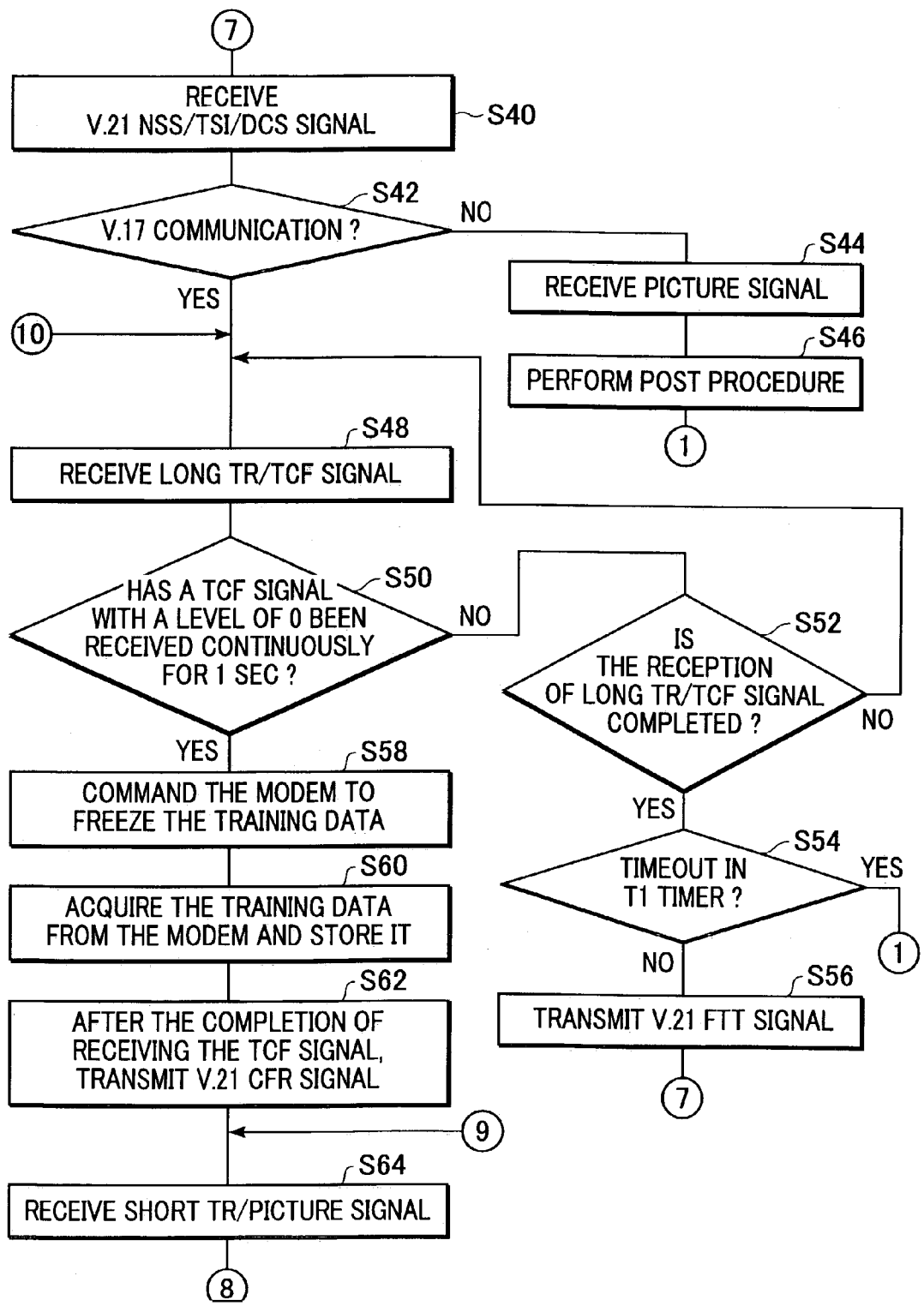
FIG. 6 is a flow chart showing an operation of the facsimile machine shown in FIG. 1.
Figure 7:
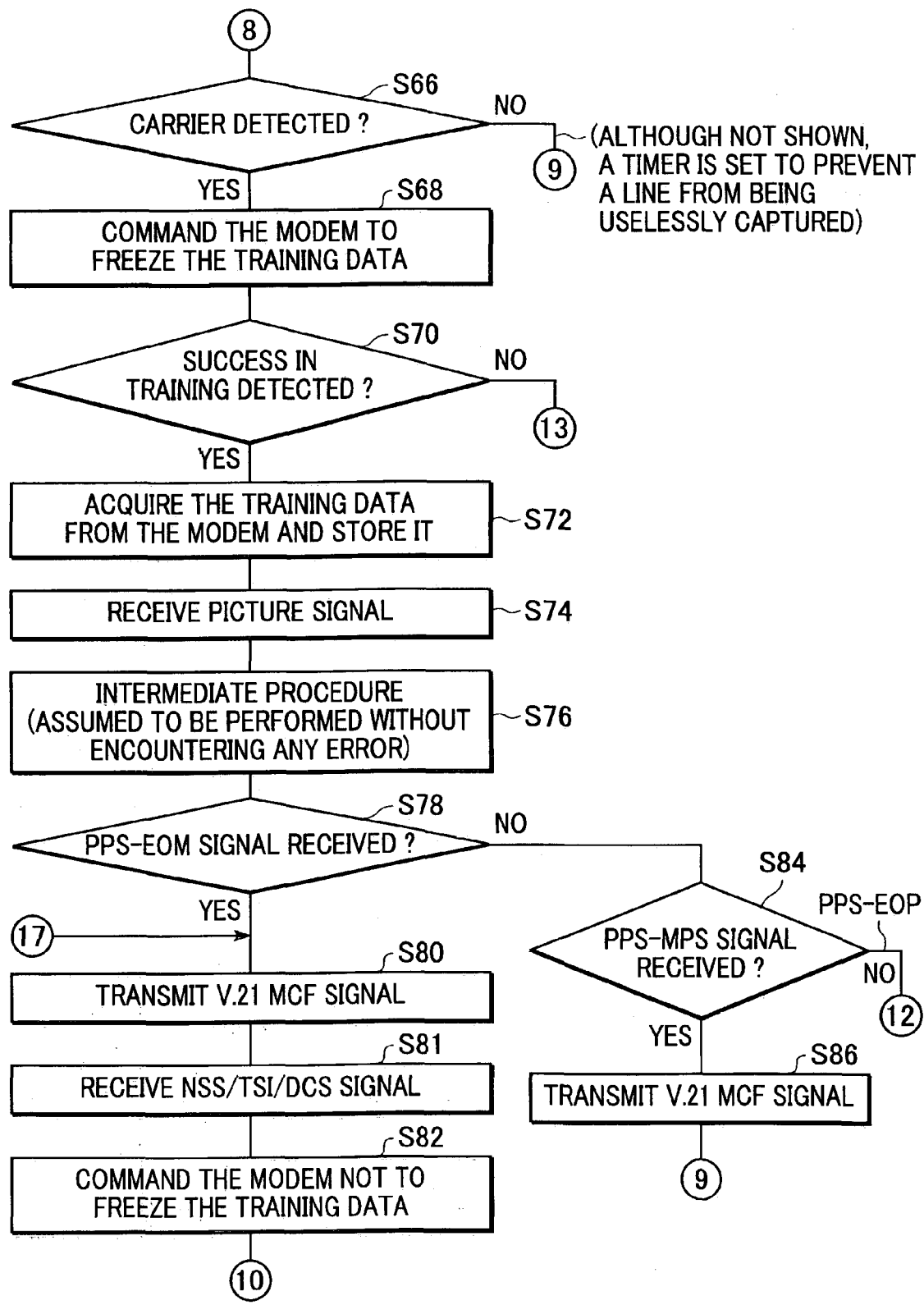
FIG. 7 is a flow chart showing an operation of the facsimile machine shown in FIG. 1.
Figure 8A:
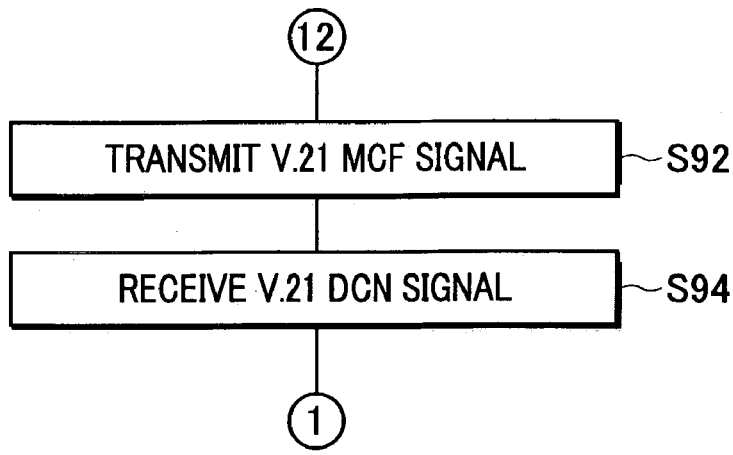
FIG. 8 is a flow chart showing an operation of the facsimile machine shown in FIG. 1.
Figure 8B:
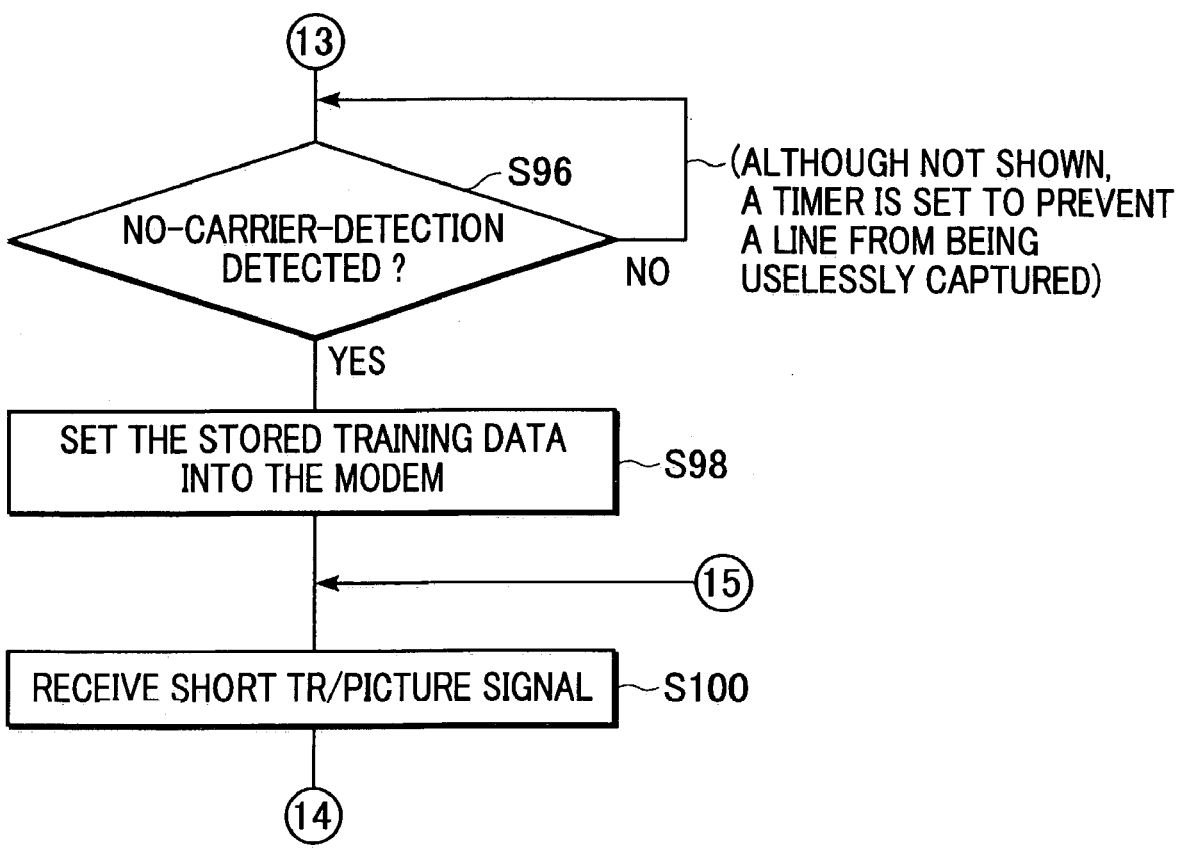
Figure 9:
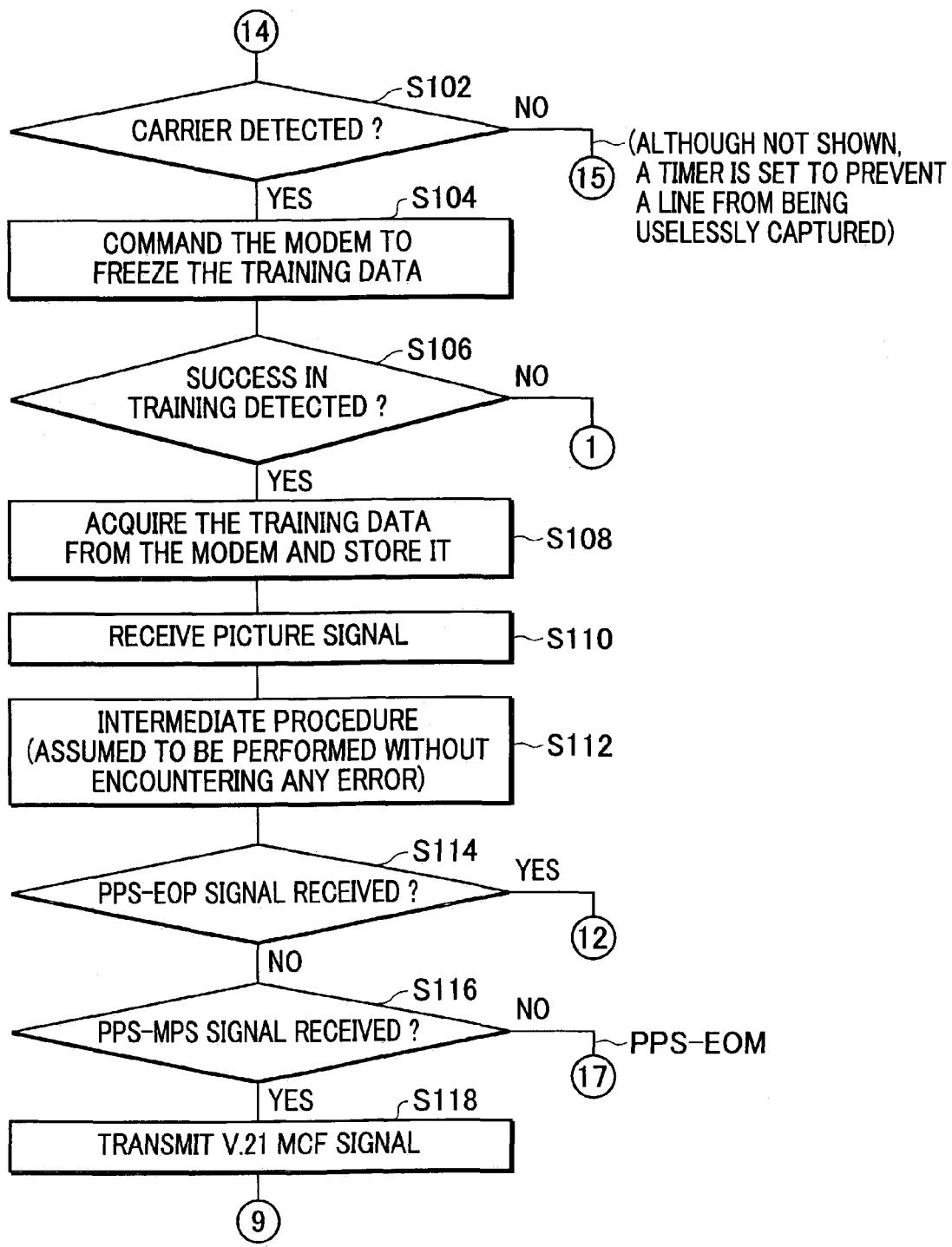
FIG. 9 is a flow chart showing an operation of the facsimile machine shown in FIG. 1.
Figure 10:
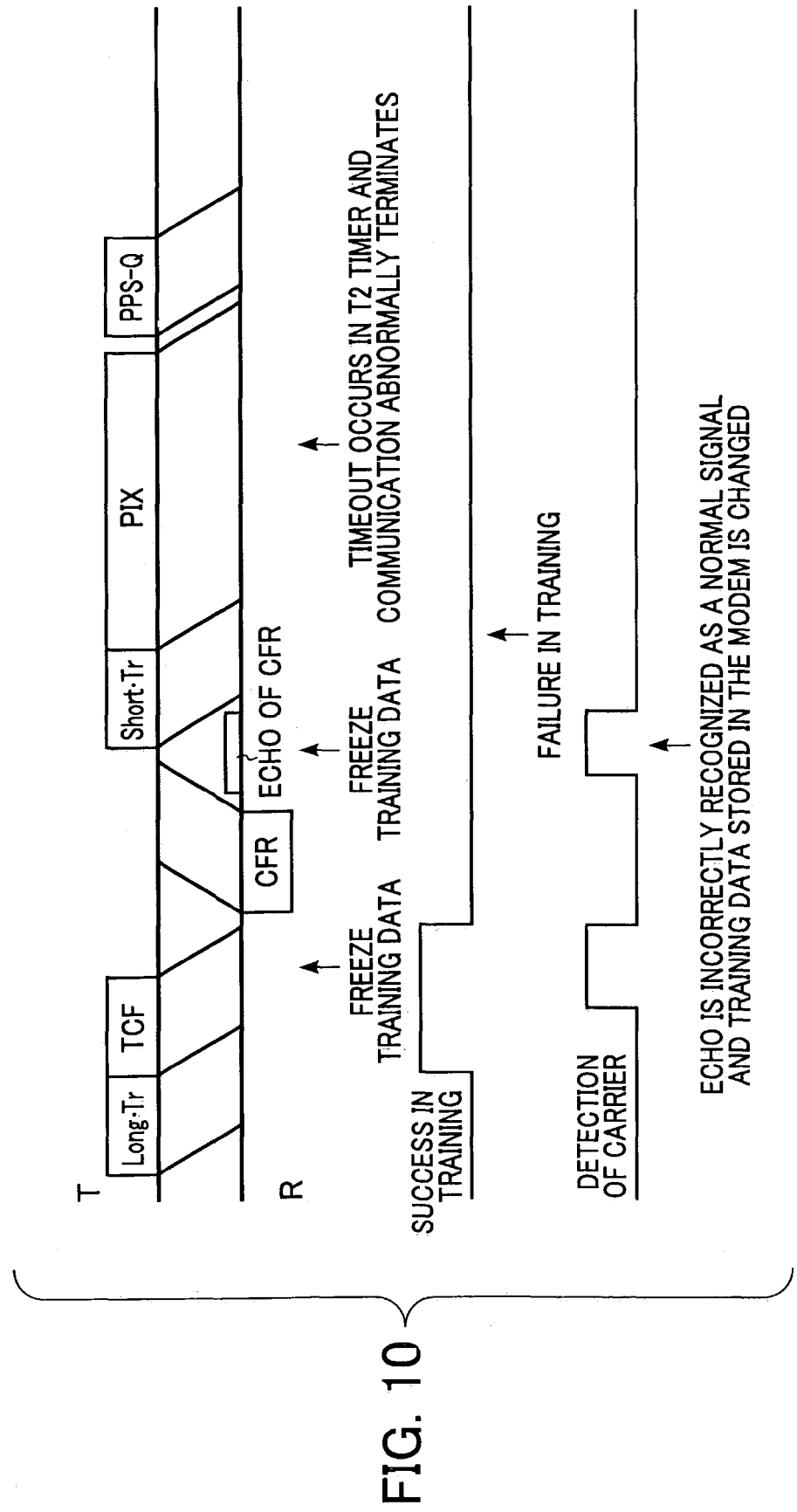
FIG. 10 is a diagram showing a protocol executed by a conventional facsimile machine when there is an echo.

FIG. 3 shows a protocol executed in the present embodiment when an echo is detected. Information indicating that training information has been successfully received and information indicating that a high-speed carrier has been detected are also shown in FIG. 3.

In this case, if the modem receives a TCF signal and detects the 0-signal continuing for 1 sec, the CPU 22 commands the modem 8 to freeze training data. When the modem 8 receives the picture signal and detects the high-speed carrier, the CPU 22 also commands the modem 8 to freeze training data.

In this specific example, an echo of a CFR signal transmitted from the receiving communication apparatus is received by the receiving communication apparatus, and a high-speed carrier is detected. In response, the CPU 22 commands the modem 8 to freeze training data.

If the modem receives a TCF signal and detects the 0-signal continuing for 1 sec, the CPU 22 reads the training data from the modem 8 and stores it. After the receiving communication apparatus detects the high-speed carrier of the echo of the transmitted CFR signal, if success in training is detected, the CPU 22 reads stored training data which was detected when there was no echo, and the CPU 22 sets it into the modem 8. When the modem 8 receives a picture signal and detects a high-speed carrier, the CPU 22 reads the training data from the modem 8 and stores it into the RAM 18.

When a PPS-MPS signal is received, an MCF signal is transmitted and receiving of a short training/picture signal is started. On the other hand, when a PPS-EOM signal is received, a MCF signal is transmitted and then a DIS signal is transmitted. When a CTC signal is received, a CTR signal is transmitted and receiving of a long training/picture signal is started. In this case, after the CTR signal is transmitted and immediately before the long training signal is received, the CPU 22 commands the modem 8 to release the freezing of the training data.

A ROM 24 stores a program for realizing, in a facsimile machine having the capability of communication according to the ITU-T recommendation V.17, means for, when long training information is received, storing the training information, means for detecting a success in receiving short training information, means for detecting high-speed data, means for setting the stored training information into the modem 8, and control means for changing the receiving operation in response to detection of short training information and high speed data.

More specifically, in the case in which high-speed data is detected after short training information is detected, training information, which was stored when long training information was received, is not set into the modem 8 when the short training information is received. In the case in which short training information is detected after high-speed data is detected, training information, which was stored when long training information was received, is set into the modem 8 when the short training information is detected. When a picture signal is received, if short training information is successfully received, the training information is stored. The process described above is performed in accordance with the program stored in the ROM 24.

The operation performed in the present embodiment is described in further detail with reference to flow charts shown in FIGS. 4 to 9.

In step S2, memory 18 is initialized via the bus 26. In step S4, the display of the operation control panel 20 is cleared via the bus 26. In step S6, the CML of the NCU 2 is turned off via the bus 26.

In step S8, it is determined whether a facsimile reception operation is selected. If the facsimile reception operation is selected, the process proceeds to step S12. However, if the facsimile reception operation is not selected, the process proceeds to step S10 to perform other processing. In step S12, the CML of the NCU 2 is turned on via the bus 26. In step S14, the timeout value of a timer T1 is set to 35 sec. In step S16, the timeout value of an ANSam timer is set to 5 sec. In step S18, an ANSam signal is transmitted.

In step S20, it is determined whether a CM signal is detected. If a CM signal is detected, the process proceeds to step S22. However, a CM signal is not detected, the process proceeds to step S24. In step S22, the remaining process including the V.8 procedure, V.34 picture transmission, and V.34 procedure is performed.

In step S24, it is determined whether timeout occurs in the ANSam timer. If timeout has occurred in the ANSam timer, the process proceeds to step S26. However, if timeout has not yet occurred in the ANSam timer, the process proceeds to step S20.

In step S26, a V.21 NSF/CSI/DIS signal is transmitted. In step S28, the timeout value of a timer T4 is set to 3 sec.

In step S30, it is determined whether a V.21 NSS/TSI/DCS signal is received. If a V.21 NSS/TSI/DCS signal is received, the process proceeds to step S40. However, a V.21 NSS/TSI/DCS signal is not received, the process proceeds to step S32.

In step S32, it is determined whether a V.8 CI signal is received. If a V.8 CI signal is received, the process proceeds to step S34. However, if a V.8 CI signal is not received, the process proceeds to step S36.

In step S34, it is determined whether timeout has occurred in the T1 timer. If timeout has occurred in the T1 timer, the process proceeds to step S6. However, if timeout has not occurred in the T1 timer, the process proceeds to step S16.

In step S36, it is determined whether timeout has occurred in the T4 timer. If timeout has occurred in the T4 timer, the process proceeds to step S38. However, if timeout has not yet occurred in the T4 timer, the process proceeds to step S30.

In step S38, it is determined whether timeout has occurred in the T1 timer. If timeout has occurred in the T1 timer, the process proceeds to step S6. However, if timeout has not occurred in the T1 timer, the process proceeds to step S26.

In step S40, a V.21 NSS/TSI/DCS signal is received.

In step S42, it is determined whether communication is that according to the ITU-T recommendation V.17. If the communication is according to the ITU-T recommendation V.17, the process proceeds to step S48. If the communication is not according to the ITU-T recommendation V.17, the process proceeds to step S44.

In step S44, a picture signal receiving process is performed. In step S46, a post procedure is performed. In step S48, a long training/TCF signal is received.

In step S50, it is determined whether a TCF signal with a level "0" has been continuously received for 1 sec. If a TCF signal with a level "0" has been continuously received for 1 sec, the process proceeds to step S58. However, if a TCF signal with a level "0" has not been continuously received for 1 sec, the process proceeds to step S52.

In step S52, it is determined whether the receiving of the long training/TCF signal is completed. If the receiving of the signal is completed, the process proceeds to step S54. However, the receiving of the signal is not completed, the process proceeds to step S48.

In step S54, it is determined whether timeout has occurred in the T1 timer. If timeout has occurred in the T1 timer, the process proceeds to step S6. However, if timeout has not occurred in the T1 timer, the process proceeds to step S56.

In step S56, a V.21 FTT signal is transmitted. In step S58, the CPU 22 commands the modem 8 to freeze the training data. Herein, when training data is frozen, the frozen training data is perfectly fixed in general cases. However, when a long training/TCF signal, a short training/picture signal, or a long training/picture signal is being received, the training data is adaptively and gradually adjusted.

In step S60, the training data is read from the modem and stored in the RAM 18. In step S62, in response to receiving a TCF signal, V.21 CFR signal is transmitted. Herein, it is assumed that the TCF signal is received successfully.

In step S64, a short training/picture signal is received.

In step S66, it is determined whether a high-speed carrier has been detected. If a high-speed carrier has been detected, the process proceeds to step S68. However, a high-speed carrier has not been detected, the process proceeds to step S64. Herein, in this loop to step S64, a timer is set to prevent a line from being uselessly captured, although the process associated with the timer is not described in further detail.

In step S68, the CPU 22 commands the modem 8 to freeze the training data.

In step S70, it is determined whether success in receiving training information is detected. If success in receiving training information is detected, the process proceeds to step S72. However, if success in receiving training information is not detected, it is determined that the received signal is an echo of the CFR signal transmitted in step S62, and the process proceeds to step S96. Herein, when success in receiving training information is not detected, the received signal is not short training data but an echo of the CFR signal, and thus the training data frozen in step S60 is not stored. On the other hand, if success in receiving training information is detected, correct short training information has been received, and thus the training data frozen in step S60 is stored.

In step S72, the training data is read from the modem and stored in the RAM 18. In step S74, a picture signal receiving process is performed. In step S76, an intermediate procedure is performed. Herein, it is assumed that a picture signal is received successfully without encountering any error.

In step S78, it is determined whether a PPS-EOM signal is received. If a PPS-EOM signal is received, the process proceeds to step S80. However, if a PPS-EOM signal is not received, the process proceeds to step S84.

In step S80, a V.21 MCF signal is transmitted. In step S81, a V.21 NSS/TSI/DCS signal is received. In step S82, in order to again perform training, the CPU 22 commands the modem 8 not to freeze the training data. Thereafter, the process returns to step S48.

In step S84, it is determined whether a PPS-MPS signal is detected. If a PPS-MPS signal is detected, the process proceeds to step S86. However, if a PPS-MPS signal is not detected, (that is, if a PPS-EOP signal is received), the process proceeds to step S92.

In step S92, a V.21 MCF signal is transmitted. In step S94, a V.21 DCN signal is received.

In step S96, it is determined whether a high-speed carrier is detected. If a high-speed carrier is not detected, the process proceeds to step S98. (In this case, in response to detecting a high-speed carrier, it is determined that there is no longer an echo of the transmitted CFR signal.) If a high-speed carrier is detected, the process returns to step S96. (In this case, in response to detecting a high-speed carrier, it is determined that there is still an echo of the transmitted CFR signal.) Herein, in this loop to step S96, a timer is set to prevent a line from being uselessly captured, although the process associated with the timer is not described in further detail.

In step S98, the training data is read from the modem and stored in the RAM 18. This is performed because the training data obtained in step S68 is wrong training data, correct training data, which was stored before step S68, is set into the modem 8 thereby preventing the receiving operation from being performed in accordance with the wrong training data. For example, when a picture signal including a plurality of pages is being received, if an error due to an echo occurs during short training for a second or following page, short training can be performed on the basis of short training data associated with a previous page thereby making it possible to correctly receive the picture signal.

In step S100, a short training/picture signal is received.

In step S102, it is determined whether a high-speed carrier has been detected. If a high-speed carrier is detected, the process proceeds to step S104. However, if a high-speed carrier is not detected, the process proceeds to step S100. Herein, in this loop to step S100, a timer is set to prevent a line from being uselessly captured, although the process associated with the timer is not described in further detail.

In step S104, the CPU 22 commands the modem 8 to freeze the training data.

In step S106, it is determined whether success in receiving training information is detected. If success in receiving training information is detected, the process proceeds to step S108. However, if success in receiving training information is not detected, the process proceeds to step S6.

In step S108, the CPU 22 reads the training data from the modem 8 and stores it.

In step S110, a picture signal is received. In step S112, an intermediate procedure is performed. Herein, it is assumed that the picture signal can be received successfully without encountering any error.

In step S114, it is determined whether a PPS-EOP signal is detected. If a PPS-EOP signal is received, the process proceeds to step S92. However, a PPS-EOP signal is not received, the process proceeds to step S116.

In step S116, it is determined whether a PPS-MPS is detected. If a PPS-MPS signal is detected, the process proceeds to step S118. However, if a PPS-MPS signal is not detected, (that is, if a PPS-EOM signal is received), the process proceeds to step S80.

In step S118, a V.21 MCF signal is transmitted.

Although in the embodiments described above, it is assumed that the communication apparatus is a facsimile machine, the present invention may also be applied to another type of communication apparatus having a capability of communication according to the ITU-T recommendation V.17. For example, the invention may be applied to a communication apparatus including a modem and installed in a personal computer.

Note that the embodiments described above can also be implemented in the form of programs. More specifically, one embodiment described above can be implemented in the form of a program for causing a communication apparatus to execute a procedure in communication in accordance with the ITU-T recommendation V.17, the procedure comprising the steps of storing training information when long training information is received, detecting success in receiving short training information, detecting high-speed data, setting the stored training information into a modem, and changing the receiving operation in response to detecting short training information and high-speed data.

Another embodiment described above can be implemented in the form of a program for causing a communication apparatus to execute a procedure comprising the steps of performing long training and short training, acquiring first training information on the basis of training performed in the training step, acquiring second training information on the basis of training performed in the training means, after the acquisition of the first training information in the first training information acquisition step, receiving information in accordance with the second training information acquired in the second training information acquisition step, detecting success in training, and detecting a high-speed carrier, wherein when a high-speed carrier is detected but success in training is not detected, receiving of information in the receiving information step is performed without using the second training information.

If a high-speed carrier is detected but success in training is not detected, receiving of information in the information receiving step may be performed in accordance with the first training information acquired in the first training information acquisition step.

In the embodiments described above, in the case in which success in training is not detected in step S70 or S106, training information, which was frozen in step S68 or S104 in the modem 8, is not read from the modem 8 and is not stored into the RAM 18. Alternatively, the training information may be read from the modem 8 and stored in the RAM 18, if this training information is not used in following communication.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication apparatus having a capability of communication according to the ITU-T recommendation V.17, comprising:

training information storage means for storing training information when long training information is received;

success in reception-of-short-training detection means for detecting success in receiving short training;

high-speed data detection means for detecting highspeed data;

training information setting means for setting the stored training information into a modem;

reception control changing means for changing reception control in response to detection of the success in receiving the short training and detection of the high-speed data, wherein if, after a CFR signal is transmitted, the highspeed data is detected and the success in receiving the short training is also detected, said reception control changing means does not set the training information, which was stored when the long training information is received, into the modem, and wherein if, after the CFR signal is transmitted, the high-speed data is detected but the success in receiving the short training is not detected, said reception control changing means sets the training information, which was stored when the long training information is received, into the modem; and transmission means for transmitting the CFR signal according to the ITU-T recommendation V.21.

2. The communication apparatus according to claim 1, further comprising means for storing the training information when a picture signal is received.

3. The communication apparatus according to claim 2, further comprising means for storing the training information when the picture signal is received and the short training is successfully received.

4. A communication apparatus comprising:
training execution means for performing long training and short training;
first training information acquisition means for acquiring first training information on the basis of training performed by the execution means;
second training information acquisition means for acquiring second training information on the basis of training performed by said execution means, after the acquisition of the first training information by said first training information acquisition means;
receiving means for receiving information in accordance with the second training information acquired by said second training information acquisition means;
success-in-training detection means for detecting success in training;
high-speed carrier detection means for detecting a high-speed carrier; and
transmission means for transmitting a CFR signal according to the ITU-T recommendation V.21,
wherein if, after the CFR signal is transmitted, the high-speed carrier is detected but the success in training is not detected, said receiving means receives the information in accordance with the first training information acquired by the first training information acquisition means without using the second training information.

5. A communication method capable of performing communication in accordance with the ITU-T recommendation V.17 comprising:
a training information storing step of storing training information when long training information is received;
a success in reception-of-short-training detection step of detecting success in receiving short training;
a high-speed data detection step of detecting highspeed data;
a training information setting step of setting the stored training information into a modem;
a reception control changing step of changing reception control in response to detection of the success in receiving the short training and detection of the high-speed data, wherein if, after a CFR signal is transmitted, the highspeed data is detected and the success in receiving the short training is also detected, the training information, which was stored when the long training information is received, is not set into the modem, and wherein if, after the CFR signal is transmitted, the high-speed data is detected but the success in receiving the short training is not detected, the training information, which was stored when the long training information is received, is set into the modem; and
a transmitting step of transmitting the CFR signal according to the ITU-T recommendation V.21.

6. A communication method comprising:
a training execution step of performing long training and short training;
a first training information acquisition step of acquiring first training information on the basis of training performed in said execution step;
a second training information acquisition step of acquiring second training information on the basis of training performed in said execution step, after the acquisition of the first training information in said first training information acquisition step;
a receiving step of receiving information in accordance with the second training information acquired in said second training information acquisition step;
a success-in-training detection step of detecting success in training;
a high-speed carrier detection step of detecting a high-speed carrier; and
a transmitting step of transmitting a CFR signal according to the ITU-T recommendation V.21,
wherein if, after the CFR signal is transmitted, the high-speed carrier is detected but the success in training is not detected, the information is received in said receiving step in accordance with the first training information acquired in said first training information acquisition step without using the second training information.

7. The communication method according to claim 6, wherein
if the high-speed carrier is detected but the success in training is not detected, said receiving step receives the information in accordance with the first training information acquired in said first training information acquisition step.

8. A computer-readable medium encoded with a computer-executable program capable of performing communication in accordance with the ITU-T recommendation V.17 and for causing a communication apparatus to perform processing comprising:
a training information storing step of storing training information when long training information is received;
a success in reception-of-short-training detection step of detecting success in receiving short training;
a high-speed data detection step of detecting highspeed data;
a training information setting step of setting the stored training information into a modem;
a reception control changing step of changing reception control in response to detection of the success in receiving the short training and detection of the high-speed data, wherein if, after a CFR signal is transmitted, the highspeed data is detected and the success in receiving the short training is also detected, the training information, which was stored when the long training information is received, is not set into the modem, and wherein if, after the CFR signal is transmitted, the high-speed data is detected but the success in receiving the short training is not detected, the training information, which was stored when the long training information is received, is set into the modem; and
a transmitting step of transmitting the CFR signal according to the ITU-T recommendation V.21.

9. A computer-readable medium encoded with a computer-executable program for causing a communication apparatus to perform processing comprising:
a training execution step of performing long training and short training;
a first training information acquisition step of acquiring first training information on the basis of training performed in said execution step;
a second training information acquisition step of acquiring second training information on the basis of training performed in said execution step, after the acquisition of the first training information in said first training information acquisition step;

a receiving step of receiving information in accordance with the second training information acquired in said second training information acquisition step;

a success-in-training detection step of detecting success in training;

a high-speed carrier detection step of detecting a high-speed carrier;

a transmitting step of transmitting a CFR signal according to the ITU-T recommendation V.21; and a step of causing the information to be received in said receiving step in accordance with the first training information acquired in said first training information acquisition step without using the second training information if, after the CFR signal is transmitted, the high-speed carrier is detected but the success in training is not detected.

10. The computer-readable medium encoded with a computer-executable program according to claim 9, wherein if the highspeed carrier is detected but the success in training is not detected, said receiving step receives the information in accordance with the first training information acquired in said first training information acquisition step.

* * * * *